United States Patent [19]

Macholdt et al.

[11] Patent Number: 6,159,649
[45] Date of Patent: Dec. 12, 2000

[54] ELECTROPHOTOGRAPHIC, RESIN-CONTAINING, ELECTRET, OR INKJET COMPOSITIONS CONTAINING MAGENTA AZO PIGMENT AND USE THEREOF

[75] Inventors: Hans-Tobias Macholdt, Darmstadt-Eberstadt; Dieter Baumgart, Egelsbach; Rüdiger Baur, Eppstein, all of Germany

[73] Assignee: Clariant GmbH, Frankfurt, Germany

[21] Appl. No.: 09/156,819

[22] Filed: Sep. 18, 1998

Related U.S. Application Data

[63] Continuation-in-part of application No. 08/874,023, Jun. 12, 1997, abandoned.

[30] Foreign Application Priority Data

Jun. 12, 1997 [DE] Germany ............... 196 23 565

[51] Int. Cl.[7] .............. G03G 9/09; C09D 11/00; C08J 5/42

[52] U.S. Cl. ............. 430/137; 430/106; 106/31.8; 524/159; 524/194; 524/270

[58] Field of Search .................. 430/106, 111, 430/137; 106/31.8; 524/159, 194, 270

[56] References Cited

U.S. PATENT DOCUMENTS

| | | |
|---|---|---|
| 3,674,527 | 7/1972 | Komander . |
| 3,970,601 | 7/1976 | Weber et al. ............... 524/190 |
| 4,403,077 | 9/1983 | Uhrig et al. . |
| 4,729,796 | 3/1988 | Deubel et al. . |
| 4,765,841 | 8/1988 | Vinther et al. . |
| 4,767,844 | 8/1988 | Ando et al. . |
| 4,795,690 | 1/1989 | Shindo et al. . |
| 4,957,841 | 9/1990 | Macholdt et al. . |
| 5,015,676 | 5/1991 | Macholdt et al. . |
| 5,021,473 | 6/1991 | Macholdt et al. . |
| 5,049,467 | 9/1991 | Yamanaka et al. . |
| 5,051,585 | 9/1991 | Koshishiba et al. . |
| 5,061,585 | 10/1991 | Macholdt et al. . |
| 5,069,994 | 12/1991 | Gitzel et al. . |
| 5,187,038 | 2/1993 | Gitzel et al. . |
| 5,190,585 | 3/1993 | McCrae et al. . |
| 5,342,723 | 8/1994 | Macholdt et al. . |
| 5,352,729 | 10/1994 | Birkhofer et al. . |
| 5,378,571 | 1/1995 | Macholdt et al. . |
| 5,453,151 | 9/1995 | Babler et al. ............ 106/497 |
| 5,475,119 | 12/1995 | Baur et al. . |
| 5,502,118 | 3/1996 | Macholdt et al. . |
| 5,554,471 | 9/1996 | Berttrand et al. ............ 430/106 |
| 5,563,016 | 10/1996 | Baur et al. . |
| 5,585,216 | 12/1996 | Baur et al. . |
| 5,766,816 | 6/1998 | Nagase et al. ............ 430/124 |

FOREIGN PATENT DOCUMENTS

| | | |
|---|---|---|
| 065 751 | 12/1982 | European Pat. Off. . |
| 0 202 906 | 11/1986 | European Pat. Off. . |
| 0 258 651 | 3/1988 | European Pat. Off. . |
| 0 359 123 | 3/1990 | European Pat. Off. . |
| 0 385 580 | 9/1990 | European Pat. Off. . |
| 441255 A2 | 8/1991 | European Pat. Off. . |
| 490253 A2 | 6/1992 | European Pat. Off. . |
| 705 886 | 4/1996 | European Pat. Off. . |
| 2 001 505 | 7/1970 | Germany . |
| 40 31 705 | 4/1992 | Germany . |
| 41 42 541 | 6/1993 | Germany . |
| 43 32 170 | 3/1995 | Germany . |
| 44 18 842 | 12/1995 | Germany . |
| 62-71966 | 2/1987 | Japan . |
| 91/10172 | 7/1991 | WIPO . |

OTHER PUBLICATIONS

P. Gregory, "High Technology Appln. Of Organic Colorants", Topics in Applied Chemistry, Plenum Press, N.Y. 1991, pp. 99–102.

V. Sclosser et al., "Charge Control in Color Toners: Overcompensation versus Neutralisation", Society of Imaging Science and Technology, Proceedings, pp. 110–112.

Foreign Search Report, German Patent Office (1997).

*Primary Examiner*—Christopher D. Rodee
*Attorney, Agent, or Firm*—Susan S. Jackson; Scott E. Hanf

[57] ABSTRACT

The use of an azo pigment of the formula (1)

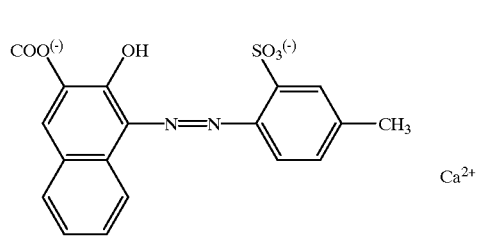

(1)

as a colorant in electrophotographic toners, electrophotographic developers, powders and powder coatings, and electret materials, wherein said azo pigment is prepared in the presence of 20 to 50% by weight of an auxiliary selected from the group consisting of a rosin, a salt of a rosin, an abietic acid, and a salt of an abietic acid, wherein said weight is based on the overall weight of the azo pigment including said auxiliary, and wherein the azo pigment has a specific surface area of more than 70 $m^2/g$ and the azo pigment particles comprising the azo pigment have a length-to-width ratio of on average less than 2.8:1 and a mean particle size $d_{50}$ of less than 130 nm.

12 Claims, No Drawings

ELECTROPHOTOGRAPHIC, RESIN-CONTAINING, ELECTRET, OR INKJET COMPOSITIONS CONTAINING MAGENTA AZO PIGMENT AND USE THEREOF

This application is a continuation-in-part of copending application(s) application Ser. No. 08/874,023 filed Jun. 12, 1997 now abandoned.

BACKGROUND OF THE INVENTION

In electrophotographic recording techniques a "latent charge image" is produced on a photoconductor. This latent charge image is developed by applying an electrostatically charged toner which is then transferred, for example to paper, textiles, foils or plastic, and is fixed by means, for example, of pressure, radiation, heat or the action of a solvent. Typical toners are one- or two-component powder toners (also called one- or two-component developers); furthermore, special toners are also employed, examples being magnetic or liquid toners and polymerization toners (L. B. Schein, "Electrophotography and Development Physics"; Springer Series in Electrophysics 14; Springer-Verlag, 2nd edition, 1992).

One measure of the quality of a toner is its specific charge q/m (charge per unit mass). In addition to the sign and level of the electrostatic charge, the rapid obtainment of the desired charge level and the constancy of this charge over a prolonged activation period, in particular, is a decisive quality criterion. Moreover, the insensitivity of the toner to climatic effects such as temperature and atmospheric humidity is another important suitability criterion.

Both positively and negatively chargeable toners are used in photocopiers, laser printers, LEDs (light-emitting diodes), LCS (liquid crystal shutter) printers or other digital printers based on electrophotography, depending on the type of process and type of equipment.

To obtain electrophotographic toners or developers with either a positive or negative charge it is common to add charge control agents. As the color-imparting component in color toners use is typically made of organic color pigments. Relative to dyes, color pigments have considerable advantages on account of their insolubility in the application medium, examples being improved thermal stability and light fastness.

On the basis of the principle of subtractive colour mixing it is possible, with the aid of the three primary colors yellow, cyan and magenta, to reproduce the entire spectrum of colors visible to the human eye. Exact color reproduction is only possible if the particular primary color satisfies the precisely defined color requirements. If this is not the case, some shades cannot be reproduced and the color contrast is inadequate.

In the case of full color toners the three toners yellow, cyan and magenta must not only meet the precisely defined color requirements but must also be matched exactly to one another in their triboelectric properties, since they are transferred one after another in the same device.

It is known that colorants may have a long-term effect in some cases on the triboelectric charging of toners (H.-T. Macholdt, A. Sieber, Dyes & Pigments 9 (1988), 119–127). Because of the different triboelectric effects of colorants and, as a result, their sometimes highly pronounced effect on toner chargeability it is not possible simply to add the colorants to a toner base formulation once prepared. Rather, it may be necessary to prepare a specific formulation for each colorant, with the nature and amount of the required charge control agent being tailored specifically. This approach is correspondingly laborious and in the case of color toners for process color is just another difficulty to add to those already described above.

Furthermore, it is important for practical use that the colorants possess high thermal stability and good dispersibility. Typical temperatures for incorporation of colorants in the toner resins are between 100 C and 200 C when using compounders or extruders. Accordingly, a thermal stability of 200 C, or even better 250 C, is a great advantage. It is also important that the thermal stability is maintained over a prolonged period (about 30 minutes) and in different binder systems. Typical toner binders are resins formed by addition polymerization, polyaddition and poly-condensation, such as styrene, styrene-acrylate, styrene-butadiene, acrylate, polyester, phenolic and epoxy resins, polysulfones and polyurethanes, individually or in combination, which may also include further ingredients, such as charge control agents, waxes or flow assistants, or may have these ingredients added subsequently.

Magenta pigments for electrophotographic toners and developers are employed in numerous forms. Typically employed magenta pigments are C.I. Pigment Red 122 based on quinacridone compounds, C.I. Pigment Red 48, C.I. Pigment Red 57:1, C.I. Pigment Red 146 and C.I. Pigment Red 184 based on azo compounds and C.I. Pigment Violet 1 and C.I. Pigment Red 8 based on triarylcarbonium compounds.

The magenta colorant C.I. Pigment Red 57:1 is of particular interest since it corresponds to the standard magenta shade. An alternative to C.I. Pigment Red 57:1 on account of its color is C.I. Pigment Violet 1, although this has poorer fastness properties, especially light fastness properties, so that in practical use in toners it usually has to be blended with the very much more lighffast C.I. Pigment Red 122 (2,9-dimethyl-quinacridone).

Fundamentally there is a need for a magenta pigment possessing a very high degree of transparency, blueness, good dispersibility and an extremely stable inherent triboelectric effect.

The term stable inherent triboelectric effect is understood as meaning that the pigment reaches its maximum triboelectric effect on the toners after a very short activation time, and that this level remains stable over a very long activation period. Toners and developers which exhibit unstable q/m values, i.e. whose level of charge depends greatly on the activation period, are correspondingly difficult to control.

Transparency is of central importance since, in the case of full color copiers or in printing, the colors yellow, cyan and magenta are copied or printed over one another, the sequence of the colors depending on the device. Consequently, if an overlying color is not sufficiently transparent, the underlying color is unable to show through to a sufficient extent and the color reproduction is distorted. In the case of copying or printing on sheets for overhead projection use, transparency is even more important, since in this case a lack of transparency even in just one color makes the whole of the projected image appear gray.

SUMMARY OF THE INVENTION

The present invention relates to an electrophotographic toner and developer based on C.I. Pigment Red 57:1 as colorant.

The object of the present invention was to provide an extremely strongly colored, transparent and bluish magenta colorant with a very stable inherent triboelectric effect, good dispersibility and high thermal stability for use in electrophotographic toners and developers, powders and powder coatings, inkjet inks and in electret materials.

This object has surprisingly been achieved by the azo pigment described below. The present invention provides for the use of an azo pigment of the formula (1)

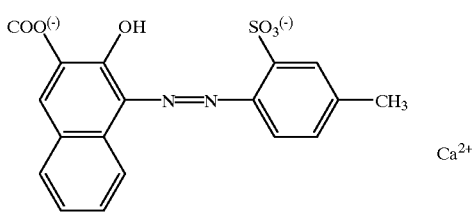

(1)

as colorant in electrophotographic toners and developers, powders and powder coatings, electret materials and in inkjet inks, wherein the azo pigment powder has a specific surface area of more than 70 m$^2$/g, preferably more than 80 m$^2$/g, especially more than 85 m$^2$/g, and wherein the azo pigment particles have a length-to-width ratio of on average less than 2.8:1 and a mean particle size $d_{50}$ of less than 130 nm. The pigment powder may have a specific surface area of up to 200 m$^2$/g, in particular up to 150 m$^2$/g.

The present invention provides for a process wherein the azo pigment of formula (1) is synthesized in the presence of 20 to 50% by weight, based on the overall weight, of a rosin, a salt of a rosin, an abietic acid, or the salt of an abietic acid, to give the desired pigment particle morphology, but in the absence of a charge control agent, such as cationic salt like compounds. After the pigment is finished, it can be added to a toner binder to give electrostatic properties even without an additional charge control agent. Nevertheless, it is optional to add some charge control agent, but only after the azo pigment has already been finished.

DESCRIPTION OF THE PREFERRED EMBODIMENTS

What is new and surprising about the pigment of the present invention is its novel particle morphology, particle size and specific surface area which represents a significant improvement over the conventional C.I. Pigment Red 57:1. The pigment of the present invention has a high degree of transparency and blueness, good color strength, good dispersibility, and a stable inherent electrostatic effect. In particular, the particles that comprise the pigment of the present invention have a length-to-width ratio which is on average less than 2.7:1, a particle size $d_{25}$ that is less than 100 nm and a $d_{75}$ that is less than 180 nm.

Conventional C.I. Pigment Red 57:1 possesses a strong negative electrostatic effect (JA-A 62–71 966, P.Gregory "High Technology Applications of Organic Colorants", Plenum Press, New York 1991, pp. 99–102). U.S. Pat. No. 4,957,841 describes how, by adding appropriate ammonium, iminium, phosphonium, arsonium or stibonium compounds, it is possible to eliminate wholly or in part the strong negative triboelectric effect, it being necessary to add these additives alternatively during the coupling reaction, during laking or during the pigment finish.

A description has also been given of how by means of specific master-batches, i.e. highly concentrated preliminary dispersions of pigment in selected resins, it is possible to suppress the inherent triboelectric effect of C.I. Pigment Red 57:1 (V. Schlösser et al., Society of Imaging Science and Technology, 11th Congress on Advances in Non-Impact Printing Technologies, Hilton Head, S.C., Oct. 29–Nov. 11, 1995, Proceedings pp. 110–112). In addition to the additional operating step, this method has the disadvantage that it is necessary to use a tailor-made masterbatch for each toner resin, which is highly complex and uneconomic. If only the masterbatch based on the standard resin indicated is used, then the toner system becomes contaminated by foreign resin. By using the novel azo pigment of the present invention, the disadvantages of such additional operating steps are avoided.

The preparation of conventional C.I. Pigment Red 57:1 is described, for example, in "Ullmanns Encyklopädie der Technischen Chemie", Volume 18, pp. 661–695, Verlag Chemie, Weinheim 1979; or in W. Herbst, K. Hunger, "Industrial Organic Pigments", VCH Weinheim 1993 or in "Pigment Handbook", editor: T. C. Patton, J. Wiley & Sons, New York, 1973. The azo pigment used in accordance with the invention is prepared by adding, at any desired point in time during the synthesis, an auxiliary based on nonionogenic alkoxylates of alcohols, fatty alcohols, phenols, alkylphenols, naphthols, alkylnaphthols or fatty amines and ethylene oxide and/or propylene oxide, and also block polymers of ethylene oxide and propylene oxide; compounds with a poly(ethyleneoxy) chain or a poly (ethyleneoxy)-poly(methylethyleneoxy) chain which are attached via an oxygen or a nitrogen atom to radicals of the following kind: primary or secondary alkyl radicals having 6 to 26 carbon atoms, particularly preferably alkyl radicals with a chain length of 9 to 18 carbon atoms, specifically nonyl, decyl, undecyl, dodecyl, tridecyl, tetradecyl, pentadecyl, hexadecyl, heptadecyl, octadecyl, 2-butyloctyl, 2-phenyloctyl, 2-hexyldecyl, 2-heptylundecyl, 2-octyldodecyl, 2-nonyltridecyl, 2-decyltetradecyl, 10-undecenyl, oleyl, 9-octadecenyl, linoleyl or linolenyl radicals; cycloaliphatic radicals having 6 to 30 carbon atoms; aromatic radicals, such as the substituted or unsubstituted phenyl radical or the alkylphenyl radical having up to three primary or secondary alkyl radicals, preferably the hexylphenyl, heptyl phenyl, octylphenyl, nonylphenyl, undecylphenyl, dodecylphenyl, isononyl-phenyl, tributylphenyl or dinonylphenyl radical, it being possible for the phenyl radical to be substituted by further aromatic radicals, such as the benzyl-p-phenyl-phenyl radical; naphthyl or alkylnaphthyl radicals, preferably the -naphthyl or β-naphthyl radical or the alkyl-β-naphthyl radical having 1 to 3 unbranched or branched alkyl groups, examples being methyl, butyl, octyl, nonyl, decyl, dodecyl and tetradecyl; unsubstituted or alkyl-substituted heterocyclic radicals or alkyl radicals substituted by heterocyclic radicals, for example the 2-[2-(8-heptadecen-1-yl)-4,5-dihydro-1-imidazolyl]ethyl radical. It is also possible to employ mixtures of the abovementioned compounds and, in particular, mixtures as are produced in the alkoxylation, using ethylene oxide and/or propylene oxide, of synthetic fatty alcohols from the oxo synthesis or of fatty alcohols from natural raw materials (after fat cleavage and reduction). Natural raw materials include coconut oil, palm oil, cottonseed oil, sunflower oil, soybean oil, linseed oil, rapeseed oil, tallow and fish oil. Also suitable are corresponding fatty amine alkoxylates of these natural raw materials, especially coconut fatty amine, tallow amine, oleylamine or dialkyl-fatty amine oxides, for example dimethylcoconut-alkylamine oxide.

Mention may also be made of alkoxylated surface-active auxiliaries of relatively high molecular weight (surfactants)

as are described, for example, in the following documents: DE-A1-27 30 223, DE-B2-21 56 603, DE-A1-30 26 127, DE-B2-24 21 606 and EP-A1-00 17 189.

Also possible, furthermore, is the use of modern nonionic surfactants based on renewable raw materials, for example sugar alkylates, it being possible to employ all of the abovementioned nonionic surfactants as a mixture with anionic or cationic surfactants as well. Anionic surfactants of particular interest are those whose polar hydrophilic group comprises sulfonic acid, sulfuric monoester, phosphoric partial ester or carboxylate functions, such as, for example, with particular preference rosin, its salts and derivatives and abietic acid, its salts and derivatives. The cationic surfactants generally comprise a quaternary amine function (phosphonium functions are also possible) and corresponding counterions such as halide or anions derived from oxygen acids of the main group elements, it also being possible for the counterions to be present in intramolecular form (betaine-type surfactants). Primary, secondary and tertiary amines can likewise be employed; their surfactant effect is a function of the pH during the addition. Particular preference in the context of the present invention is given to rosins and abietic acids.

The auxiliary can be added before, during or after the azo coupling and/or before or during the pigment finish. It is expedient to add the auxiliary in an amount such that the ready-prepared powder pigment contains from 20 to 50% by weight, preferably from 25 to 40% by weight of auxiliary, based on the overall weight.

By means of the preparation process described said azo pigment is obtained in the novel form, said auxiliary being loaded on the pigment crystallites.

Other than in electrophotographic toners and developers, an inherent triboelectrically altered effect of a pigment can also lead to an improvement in the electrostatic charging of powders and coating materials, especially in triboelectrically or electrokinetically sprayed powder coatings as are employed for the surface coating of articles made, for example, from metal, wood, plastic, glass, ceramic, concrete, textile material, paper or rubber. Powder coating technology is employed, for example, in the coating of small articles such as garden furniture, camping equipment, domestic appliances, vehicle parts, refrigerators and shelving, and in the coating of workpieces having complex shapes. The powder coating or the powder obtains its electrostatic charge, in general, by one of the two following methods:

a) in the case of the corona method the powder coating or the powder passes a charged corona and in doing so is charged;

b) in the triboelectric or electrokinetic method, the principle of frictional electricity is utilized.

In the spraying device the powder coating or the powder receive an electrostatic charge which is opposite to the charge of the friction partner, generally a hose or spraypipe made, for example, of polytetrafluoro-ethylene. A combination of both methods is also possible.

Typical powder coating resins employed are epoxy resins, carboxyl- and hydroxyl-containing polyester resins, polyurethane resins and acrylic resins, together with the customary hardeners. Combinations of resins are also used. For example, epoxy resins are often employed in combination with carboxyl- and hydroxyl-containing polyester resins. Examples of typical hardener components for epoxy resins are acid anhydrides, imidazoles and also dicyandiamide and derivatives thereof. For hydroxyl-containing polyester resins, examples of typical hardener components are acid anhydride, capped isocyanates, bisacylurethanes, phenolic resins and melamine resins. For carboxyl-containing polyester resins, examples of typical hardener components are triglycidyl isocyanurates or epoxy resins. In acrylic resins typical hardener components employed are, for example, oxazolines, isocyanates, trig lycidyl isocya nu rates or dicarboxylic acids. The disadvantage of inadequate charging is observed in particular in the case of triboelectrically or electrokinetically sprayed powders and powder coatings which have been prepared on the basis of polyester resins, especially carboxyl-containing polyesters, or on the basis of so-called mixed powders, also referred to as hybrid powders. Mixed powders are understood to be powder coatings whose resin basis consists of a combination of epoxy resin and carboxyl-containing polyester resin. The mixed powders form the basis for the powder coatings which are most frequently encountered in practical use. Inadequate charging of these powders and power coatings causes the deposition ratio and throwing power on the workpiece that is to be coated to be inadequate, it being known that, in certain circumstances, the inherent triboelectric effect of a pigment can also be responsible for the loss of chargeability of a resin system which per se is suitable (H-T. Macholdt, "Ladungssteuermittel als Konzept für die triboelektrische Aufladung" [Charge control agents as a concept for triboelectric charging]; EPS-Schriftenreihe "Praxis Forum, Fachbrosch üre Oberflächentechnik 27/91" page 102–111; Technik & Kommunikations Verlags GmbH, Berlin (1991)). The term "throwing power" is a measure of to what extent a powder or powder coating is deposited on the workpiece to be coated, including its reverse sides, cavities, in gaps and, in particular, on inside edges and corners.

Furthermore, an altered inherent triboelectric effect of a pigment can lead to an improvement in the electret properties in the case of colored (pigmented) electret materials, typical electret materials being based on polyolefins, halogenated polyolefins, polyacrylates, polyacrylonitriles, polystyrenes or fluoropolymers, for example polyethylene, polypropylene, polytetrafluoroethylene and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates and also mixtures thereof. Electret materials have numerous fields of application and can receive their charge as a result of corona or triboelectric charging (literature reference: G. M. Sessler, "Electrets", Topics in Applied Physics, Vol. 33, Springer Verlag, New York, Heidelberg, 2nd ed., 1987).

Furthermore, an altered inherent triboelectric effect of a pigment can lead to improved separation properties of colored (pigmented) polymers that are separated by electrostatic methods (Y. Higashiyau, J. of Electrostatics, 30, pages 203–212, 1993; and J. A. Cross "Electrostatics—Principles, Problems and Applications", Adam Hilger, Bristol, 1987, especially Section 5.3 "Electrostatic Separation" and the literature cited therein). Accordingly, the inherent triboelectric effect of pigments is also of importance for the mass coloring of plastics. Similarly, the inherent triboelectric effect is important in the case of process or processing steps which involve intensive frictional contact, for example spinning processes, calendering processes or other shaping techniques.

Moreover, the novel pigment of the present invention is suitable as a colorant in inkjet inks on both an aqueous and a nonaqueous basis, especially in those inks which operate in accordance with the hot melt process. The invention provides an inkjet ink comprising from 0.01 to 50% by weight, preferably from 0.5 to 20% by weight, of the azo pigment wherein the azo pigment has the formula (1)

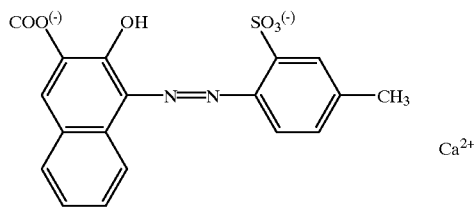

(1)

and wherein said azo pigment has a specific surface area of more than 70 m²/g and the azo pigment particles have a length-to-width ratio of on average less than 2.8:1 and a mean particle size $d_{50}$ of less than 130 nm. Preferably the specific surface area of the pigment is greater than 80 m²/g.

The particular advantage of the novel azo pigment of the present invention, especially in toner binders, can be seen in comparison with what to date has been the standard for C.I. Pigment Red 57:1 (®Permanent Rubin L6B02).

For instance, the novel pigment of the present invention (Example 1) exhibits a substantially improved transparency (more transparent by 5 evaluation units and a blueness increased by 5 evaluation units), which means a very considerable improvement for practical use. It is worth noting in particular that the novel pigment of the present invention, in comparison with the known standard, not only has a smaller particle size but also has a particle morphology which is improved in terms of an alteration from pronounced acicularity in the direction of cubicity. This improvement brings about much easier dispersibility and suspendability in polymeric materials and (organic) solvents.

The improvement that is achieved in transparency is of great advantage for practical use and is also immediately evident to the human eye. Furthermore, it is surprising that in spite of the strong improvement in transparency as a result of the very much higher specific surface area there is no loss in the other advantageous color properties of the pigment such as shade, thermal stability and light fastness. This becomes evident from the fact, for example, that in the X-ray diffraction diagram both the crystal modification and the position and mid-peak width of the reflection bands remain virtually unchanged.

Furthermore, there is a clearly evident improvement in the inherent triboelectric effect of the novel pigment of the present invention relative to the prior art to date. Whereas the conventional C.I. Pigment Red 57:1 set out in the comparison example shows a highly unstable triboelectric charging effect, this effect is highly stable in the case of the novel pigment of the present invention, i.e. the maximum charging value is attained rapidly and then remains virtually constant over 24 hours. Accordingly, a test toner containing 5% of the novel pigment of the present invention (Example 1.3.1) charges up after just 5 minutes to a peak level, whereas a comparable test toner containing a prior art pigment (Comparison Example 1.3.1) shows no constant final value even after 24 hours of frictional charging.

It is optional to combine a charge control agent(s) with the novel azo pigment of the present invention provided that it is added after the azo pigment has already been finished. There are numerous suitable charge control agents, i.e. with those providing both positive and negative control.

Suitable charge control agents which can be combined with the novel azo pigment are triphenylmethanes; ammonium and iminium compounds (immonium compounds); fluorinated ammonium and iminium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclically linked oligosaccharides (cyclodextrins); polyester salts; metal complex compounds, especially salicylate-metal and salicylate-nonmetal complexes and -hydroxy carboxylic acid-metal and -nonmetal complexes; benzimidazolones; azines, thiazines or oxazines, which are listed in the Colour Index as Pigments, Solvent Dyes, Basic Dyes or Acid Dyes.

Particular preference is given to the charge control agents indicated below which are optionally combined individually, or in combination with one another, with the novel azo pigment after the novel azo pigment has been finished. Triarylmethane derivatives, for example:

Colour Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Colour Index Solvent Blue 2, 3, 4, 5, 6, 23, 43, 54, 66, 71, 72, 81, 124, 125, and also the triarylmethane compounds listed in the Colour Index under Acid Blue and Basic Dye, provided they are suitable in terms of their temperature stability and processability, examples being Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, with Colour Index Solvent Blue 125, 66 and 124 in turn being of very particular suitability. A particularly highly suitable pigment is Colour Index Solvent Blue 124 in the form of its highly crystalline sulfate or in the form of the trichlorotriphenylmethyltetrachloroaluminate.

Very particular preference is given to metal complexes having CAS numbers 84179-66-8 (chromium azo complex), 115706-73-5 (iron azo complex), 31714-55-3 (chromium azo complex), 84030-55-7 (chromium salicylate complex), 42405-40-3 (chromium salicylate complex) and also the quaternary ammonium compound CAS No.116810-46-9.

Examples of charge control agents of the triphenylmethane series which are highly suitable for preparing electret fibers are the compounds described in DE-A-1 919 724 and in DE-A-1 644 619.

Also suitable are triphenylmethanes as described in U.S. Pat. No. 5,061,585, especially those of the formula (2)

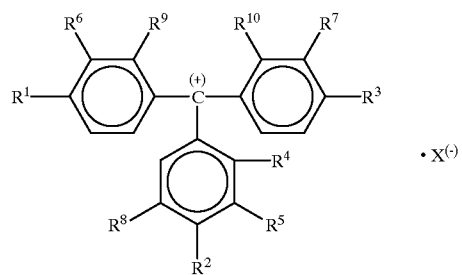

(2)

in which

R¹ and R³ are identical or different and are —NH₂, a mono- or dialkylamino group whose alkyl groups have 1 to 4, preferably 1 or 2, carbon atoms, a mono- or di-omega-hydroxyalkylamino group whose alkyl groups have 2 to 4, preferably 2, carbon atoms, an unsubstituted or N-alkyl-substituted phenylamino or phenalkylamino group whose alkyl has 1 to 4, preferably 1 or 2, carbon atoms whose phenalkyl group has 1 to 4, preferably 1 or 2, carbon atoms in the aliphatic bridge and whose phenyl nucleus can carry one or two of the following substituents: alkyl having 1 or 2 carbon atoms, alkoxy having 1 or 2 carbon atoms, and the sulfonic acid group, $R^2$ is hydrogen or has one of the meanings specified for $R^1$ and $R^3$, $R^4$ and $R^5$ are hydrogen, halogen, preferably chlorine, or a sulfonic acid group or $R^4$ together with $R^5$ forms a fused-on phenyl ring, $R^6$, $R^7$, $R^9$ and $R^{10}$ are each hydrogen or an alkyl radical having 1 or 2 carbon atoms, preferably methyl, and $R^8$ is hydrogen or halogen, preferably chlorine, and X— is a stoichiometric equivalent of an anion, especially a chloride, sulfate, molybdate, phosphoromolybdate or borate anion.

Particular preference is given to a charge control agent of the formula (2) in which $R^1$ and $R^3$ are phenylamino groups, $R^2$ is an m-methylphenylamino group and the radicals $R^4$ to $R^{10}$ are all hydrogen.

Suitability extends to ammonium and iminium compounds as described in U.S. Pat. No. 5,015,676.

Also suitable are fluorinated ammonium and iminium compounds, as described in U.S. Pat. No. 5,069,994, especially those of the formula (3)

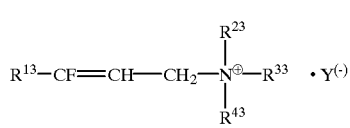

(3)

in which $R^{13}$ is perfluorinated alkyl having 5 to 11 carbon atoms, $R^{23}$, $R^{33}$ and $R^{43}$ are identical or different and are alkyl having 1 to 5, preferably 1 to 2, carbon atoms, and Y— is a stoichiometric equivalent of an anion, preferably a tetrafluoroborate or tetraphenylborate anion.

Preferably, $R^{13}$ is perfluorinated alkyl having 5 to 11 carbon atoms, $R^{23}$ and $R^{33}$ are ethyl, and $R^{43}$ is methyl.

Also suitable are biscationic acid amides as described in U.S. Pat. No. 5,342,723, especially those of the formula (4)

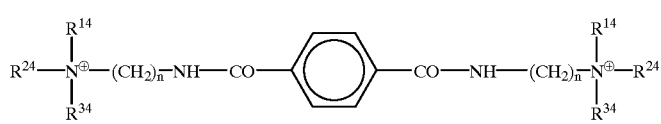

(4)

in which $R^{14}$, $R^{24}$ and $R^{34}$ are identical or different alkyl radicals having 1 to 5 carbon atoms, preferably methyl, n is an integer from 2 to 5, and Z— is a stoichiometric equivalent of an anion, preferably a tetraphenylborate anion.

Also suitable are diallylammonium compounds, as described in U.S. Pat. No. 5,475,119, especially those of the formula (5)

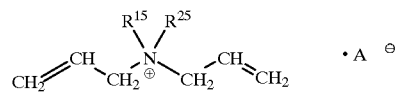

(5)

in which $R^{15}$ and $R^{25}$ are identical or different alkyl groups having 1 to 5, preferably 1 or 2, carbon atoms, but in particular are methyl groups, and A— is a stoichiometric equivalent of an anion, preferably a tetraphenylborate anion, and also the polymeric ammonium compounds of the formula (6), obtainable from these, as described in DE-A-4 029 652 or U.S. Pat. No. 5,187,038.

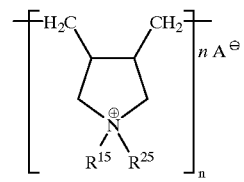

(6)

in which n has a value which corresponds to molecular weights of from 5000 to 500,000. Particular preference, however, is given to compounds of the formula (6) having molecular weights of from 40,000 to 400,000.

Also suitable are aryl sulfide derivatives, as described in U.S. Pat. No. 5,378,571, especially those of the formula (7)

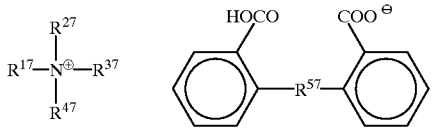

(7)

in which $R^{17}$, $R^{27}$, $R^{37}$ and $R^{47}$ are identical or different alkyl groups having 1 to 5, preferably 2 or 3, carbon atoms and $R^{57}$ is one of the divalent radicals —S—, —S—S—, —SO— or —SO$_2$—.

For example, $R^{17}$ to $R^{47}$ are propyl groups and $R^{57}$ is the group —S—S—.

Also suitable are phenol derivatives, as described in U.S. Pat. No. 4,795,690, especially those of the formula (8)

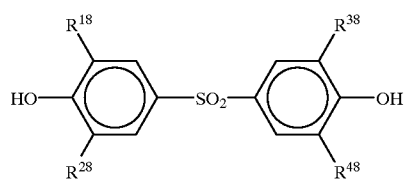
(8)

in which

R$^{18}$ and R$^{38}$ are alkyl or alkenyl groups having 1 to 5, preferably 1 to 3, carbon atoms and R$^{28}$ and R$^{48}$ are hydrogen or alkyl having 1 to 3 carbon atoms, preferably methyl.

Examples which may be mentioned are the compounds in which R$^{18}$ to R$^{48}$ are methyl groups or in which R$^{28}$ and R$^{48}$ are hydrogen and R$^{18}$ and R$^{38}$ are the group —CH$_2$—CH=CH$_2$.

Also suitable are phosphonium compounds and fluorinated phosphonium compounds, as described in U.S. Pat. No. 5,021,473 and in U.S. Pat. No. 5,147,748, especially those of the formula (9)

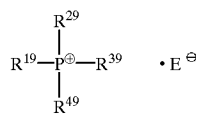
(9)

in which

R$^{19}$, R$^{29}$, R$^{39}$ and R$^{49}$ are identical or different alkyl groups having 1 to 8, preferably 3 to 6, carbon atoms and E$^\ominus$ is a stoichiometric equivalent of an anion, preferably a halide anion; and (10)

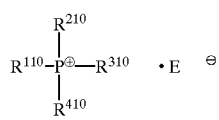
(10)

in which

R$^{110}$ is a highly fluorinated alkyl radical having 5 to 15, preferably 6 to 10, carbon atoms, R$^{210}$, R$^{310}$ and R$^{410}$ are alkyl having 3 to 10 carbon atoms or phenyl.

An example of a compound of the formula (9) which may be mentioned is tetrabutylphosphonium bromide; examples of compounds of the formula (10) which may be mentioned are the compounds where R$^{110}$=C$_8$F$_{17}$—CH$_2$—CH$_2$—, R$^{210}$=R$^{310}$=R$^{410}$=phenyl and E$^\ominus$=PF$_6^\ominus$ or the tetraphenylborate anion.

Also suitable are calix(n)arenes as described in U.S. Pat. No. 5,049,467 and as described in EP-A-0 516 434, especially those of the formula (11)

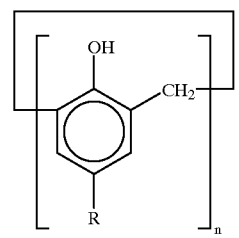
(11)

in which

R is hydrogen, halogen, preferably chlorine, straight-chain or branched alkyl having 1 to 12 carbon atoms, aralkyl, for example benzyl or phenethyl, —NO$_2$, —NH$_2$ or NHR$^{111}$, where R$^{111}$ is alkyl having 1 to 8 carbon atoms, unsubstituted or C$_1$–C$_4$-alkyl-substituted phenyl or —Si(CH$_3$)$_3$.

Also suitable are metal complex compounds, such as chromium, cobalt, iron, zinc or aluminum azo complexes or chromium, cobalt, iron, zinc or aluminum salicylic or boric acid complexes of the formula (12), (13) and (14)

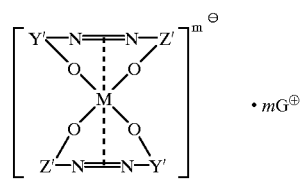
(12)

in which

M is a metal atom with a valency of 2 or 3, preferably chromium, cobalt, iron, zinc or aluminum, or else a nonmetal such as boron or Si, Y' and Z' are divalent aromatic rings, preferably of the formula

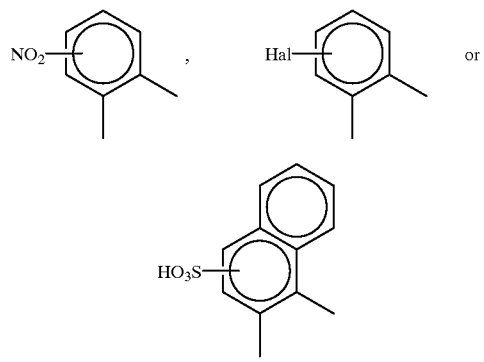

and m is 1 or 2;

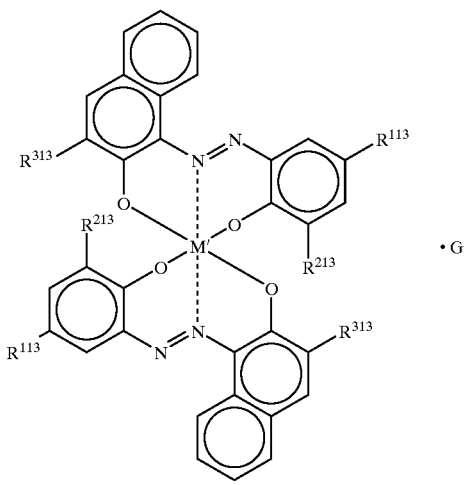

(13)

in which
M' is a metal atom with a valency of 2 or 3, preferably chromium, cobalt or, iron
$R^{113}$ is hydrogen, halogen, preferably Cl, nitro or amidosulfonyl,
$R^{213}$ is hydrogen or nitro,
$R^{313}$ is hydrogen, the sulfonic acid group or —CO—NH—$R^{413}$ where $R^{413}$ is phenyl, alkyl having 1 to 5 carbon atoms which is unsubstituted or substituted by a mono-, di- or trialkylamino group, and
G in formula (12) and (13) is in each case a counterion which brings about the neutrality of the complex, preferably one or more protons or one or more alkali metal or ammonium ions;

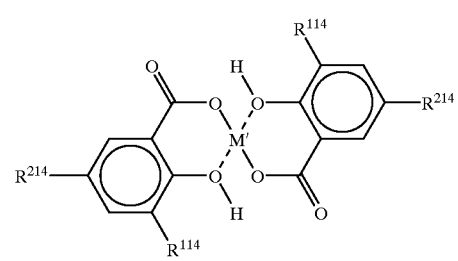

(14)

in which
M* is a divalent central metal atom, preferably a zinc atom,
$R^{114}$ and $R^{214}$ are identical or different, straight-chain or branched alkyl groups having 1 to 8, preferably 3 to 6, carbon atoms, for example tert-butyl.

Compounds of this sort are described in EP-A-0 162 632, U.S. Pat. No. 4,908,225, EP-A-0 393 479, EP-A-0 360 617, EP-A-0 291 930, EP-A-0 280 272, EP-A-0 255 925, EP-A-0 251 326, EP-A-0 180 655, EP-A-0 141 377, U.S. Pat. No. 4,939,061, U.S. Pat. No. 4,623,606, U.S. Pat. No. 4,590,141 and/or characterized by the CAS Nos 31714-55-3, 104815-18-1, 84179-68-8, 110941-75-8, 32517-36-5, 38833-00-00, 95 692-86-7, 85414-43-3, 136709-14-3, 135534-82-6, 135534-81-5, 127800-82-2, 114803-10-0, 114803-08-6.

Examples of particularly preferred metal complex compounds of the formula (13) are given in Table 1 below.

TABLE 1

| $R^{113}$ | $R^{213}$ | $R^{313}$ | $R^{413}$ | M' | G |
|---|---|---|---|---|---|
| Cl | H | H | — | Cr | H+ |
| NO2 | NO2 | —CONHR413 | Phenyl | Cr | H+/Na+/NH4+ |
| Cl | H | —CONHR413 | Phenyl | Fe | H+/Na+/NH4+ |
| Cl | H | —CONHR413 | —(CH2)3—N+(CH3)3 | Cr | Cl— |
| —SO2NH2 | H | H | — | Co | H+/Na+/NH4+ |

Also suitable are benzimidazolones, as described in EP-A-0 347 695, especially those of the formula (15)

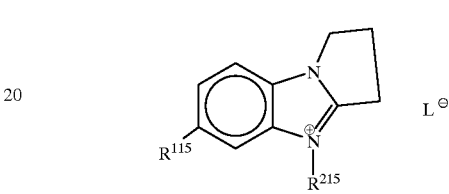

(15)

in which
$R^{115}$ is an alkyl having 1 to 5 carbon atoms and $R^{215}$ is an alkyl having 1 to 12 carbon atoms and L is a stoichiometric equivalent of an anion, especially a chloride or tetrafluoroborate anion.

An example which may be mentioned is the compound where $R^{115}=CH_3$ and $R^{215}=C_{11}H_{23}$.

Also suitable are cyclically linked oligosaccharides as described in U.S. Pat. No. 5,585,216, especially those of the formula (16)

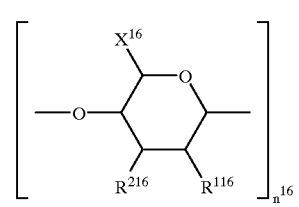

(16)

in which $n^{16}$ is a number between 3 and 100, $R^{116}$ and $R^{216}$ have the meaning of OH or $OR^{316}$, where $R^{316}$ is substituted or unsubstituted alkyl-($C_1$–$C_{18}$), aryl-($C_6$–$C_{12}$) or tosyl, and $X^{16}$ has the meaning $CH_2OH$ or $CH_2COR^{316}$. Examples which may be mentioned are:

$n^{16}=6$, $R^{116}$ and $R^{216}=OH$, $X^{16}=CH_2OH$
$n^{16}=7$, $R^{116}$ and $R^{216}=OH$, $X^{16}=CH_2OH$
$n^{16}=8$, $R^{116}$ and $R^{216}=OH$, $X^{16}=CH_2OH$.

Also suitable are polymer salts, as described in U.S. Pat. No. 5,502,118, whose anionic component is a polyester which consists of the reaction product of the individual components a), b) and c) and, if used, d) and, if used, e), where
a) a dicarboxylic acid or a reactive derivative of a dicarboxylic acid, which are free from sulfo groups,
b) a difunctional aromatic, aliphatic or cycloaliphatic sulfo compound whose functional groups are hydroxyl or carboxyl, or hydroxyl and carboxyl,
c) an aliphatic, cycloaliphatic or aromatic diol, a polyetherdiol or a polycarbonate diol, d) a polyfunctional compound (functionality>2), whose functional groups are hydroxyl or carboxyl, or hydroxyl and carboxyl, and e) a monocarboxylic acid and whose cationic component comprises hydrogen atoms or metal cations.

Also suitable are azines of the following Colour Index Numbers: C.I. Solvent Black 5, 5:1, 5:2, 7, 31 and 50; C.I. Pigment Black 1, C.I. Basic Red 2 and C.I. Basic Black 1 and 2.

In principle the novel pigment of the present invention may optionally be combined with positive and negative charge control agents (CCAs). Judicious amounts in this context are from 0.01 to 20% by weight, preferably from 0.1 to 5% by weight, of charge control agent, based on the overall weight of the electrophotographic toner or developer, powder or powder coating, in order to establish the desired polarity. A particular advantage in this context is the rapid attainment of the peak charge value and its very good constancy. Since good triboelectric (toner) charging requires a high toner breakdown resistance (=low conductivity), the dielectric characteristics of the novel magenta pigment contribute to the good triboelectric properties (Ku/Liepins "Electrical Properties of Polymers", Hanser Publishers, Munich-Vienna-New York, 1987).

The combination of pigment and charge control agent can be effected after the azo pigment has already been finished.

The invention additionally provides an electrophotographic toner or developer comprising a customary toner binder, from 0.01 to 50% by weight, preferably from 0.5 to 20% by weight, of the novel azo pigment of the present invention and from 0 to 20% by weight, preferably from 0.1 to 5% by weight, of a charge control agent from the class of the triphenylmethanes, ammonium and iminium compounds; fluorinated ammonium and iminium compounds; biscationic acid amide; polymeric ammonium compounds; diallylammonium compounds; aryl sulfide derivatives; phenol derivatives; phosphonium compounds and fluorinated phosphonium compounds; calix(n)arenes; cyclodextrins; polyester salts; metal complex compounds; benzimidazolones; azines, thiazines or oxazines.

Particular preference is given to electrophotographic toners or developers which as charge control agent comprise a compound of the formula (17)

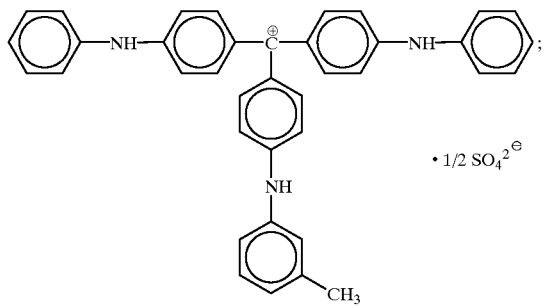

(17)

or a compound of the abovementioned formula (3);

or a compound of the abovementioned formula (5), in which $R^{15}$ and $R^{25}$ are each methyl and $A^\ominus$ is a tetraphenylborate anion;

or a compound of the abovementioned formula (6), in which $R^{15}$ and $R^{25}$ are each methyl, $A^\ominus$ is a tetraphenylborate anion and n has a value which corresponds to the molecular weights of from 5000 to 500,000;

or a compound of the abovementioned formula (7);

or a compound of the abovementioned formula (13), in which $R^{113}$ is chlorine, $R^{213}$ and $R^{313}$ are hydrogen, M' is chromium, cobalt or iron and G is one or two protons;

or an abovementioned polymer salt whose anionic component is a polyester.

The ready suitability of the novel azo pigment of the present invention for the powder coating utility is evident from the high charging current (1.2 μA in Example 1.3.2) which can be achieved at a spray pressure of only 3 bar, a charging current of 1 μA typically being regarded as the minimum requirement for satisfactory charging. The high charging current goes hand in hand with a good deposition ratio of markedly above 70% in every case.

The invention additionally provides a powder or powder coating comprising an acrylic resin or polyester resin which contains epoxide, carboxyl or hydroxyl groups, or a combination of such resins, from 0.01 to 50% by weight, preferably from 0.1 to 5% by weight, of the novel azo pigment of the present invention and from 0 to 20% by weight, preferably from 0.1 to 5% by weight, of a charge control agent from the classes and preferred compounds mentioned above for electrophotographic toners.

The pigment used in accordance with the invention is incorporated homogeneously, for example by extrusion or kneading, in a concentration of from 0.01 to 50% by weight, preferably from 0.5 to 20% by weight, with particular preference from 0.1 to 5.0% by weight, based on the overall mixture, into the binder of the respective toner, developer, coating material, powder coating, electret material or of the polymer that is to be separated electrostatically. In this context the pigment employed in accordance with the invention can be added as a dried and ground powder, as a dispersion or suspension in organic or inorganic solvents, as a filtercake, masterbatch, finished preparation, made-up paste, as a compound adsorbed onto appropriate carriers, for example kieselguhr, $TiO_2$, $Al_2O_3$, from aqueous or nonaqueous solution, or in some other form. The pigment used in accordance with the invention can likewise, in principle, also be added during the actual preparation of the respective binders, i.e. in the course of their addition polymerization, polyaddition or polycondensation.

The level of the electrostatic charge of the electrophotographic toners or of the powder coatings into which the novel pigment of the present invention is homogeneously incorporated cannot be predicted and is measured on standard test systems under identical conditions (identical dispersing times, identical particle size distribution, identical particle morphology) at about 20 C and 50% relative atmospheric humidity. The electrostatic charging of the toner is effected by fluidization with a carrier, i.e. with a standardized friction partner (3 parts by weight of toner per 97 parts by weight of carrier), on a roller bench (150 revolutions per minute). The electrostatic charge is then measured on a customary q/m measurement stand (J. H. Dessauer, H. E. Clark, "Xerography and related Processes", Focal Press, N.Y., 1965, page 289; J. F. Hughes, "Electrostatic Powder Coating", Research Studies Press Ltd., Letchworth, Hertfordshire, England, 1984, Chapter 2). In determining the q/m value or the triboelectric charge of powder coatings, the particle size exerts a great effect, which is why in the case of the toner samples or powder coating samples obtained by screening strict attention is paid to a uniform particle size distribution. Thus for toners a mean particle size of 10 μm is aimed at, whereas for powder coatings a mean particle size of 50 μm is practicable.

The triboelectric spraying of the powders (powder coatings) is carried out using a spraying device having a standard spray pipe and internal rod of star-shaped cross-section at maximum power throughput and with a spraying pressure of 3 bar. For this purpose the article to be sprayed is suspended in a spray booth and is sprayed from the front from a distance of about 20 cm with no further movement of the spraying device. The respective charging of the sprayed powder is subsequently measured using a "Meßgerät zur Messung von triboelektrischer Ladung von Pulvern" [Powder triboelectric charge meter] from Intec (Dortmund). For the measurement, the measuring antenna of the measurement device is held directly in the cloud of powder emerging from the spraying device. The current strength resulting from the electrostatic charge of powder coating or powder is indicated in $\mu$A. The deposition ratio is subsequently determined, in percent (%), by differential weighing of the sprayed and the deposited powder coating.

The transparency of the novel azo pigment in toner binder systems is investigated as follows: 30 parts by weight of the pigmented test toner (for preparation see Example 1.3.1) are stirred with a dissolver (5 min at 5000 rpm) into 70 parts by weight of a raw varnish (consisting of 15 parts by weight of the respective toner resin and 85 parts by weight of ethyl acetate).

The resulting test toner varnish is knife-coated against a similarly produced standard pigment varnish onto suitable paper (e.g. letterpress paper) using a Handcoater (from RK Chemical Co. Ltd, England). An appropriate size of doctor blade is for example K bar N 3 (=24 $\mu$m knife coating thickness). To aid determination of the transparency the paper is printed with a black bar and the differences in transparency are determined in dL values in accordance with DIN 55 988 or in accordance with the test procedure from Pigments Marketing, Hoechst AG "Visuelle und Farbmetrische Bewertung" [Visual and colorometric evaluation] of 09.13.1990 (No. 1/1).

The residual salt content indicated in connection with the characterization of the pigment describes the specific conductivity of the extract of an aqueous pigment suspension (in accordance with test procedure Pigments Marketing, Hoechst AG No. 1/10 (2/91) "Bestimmung der spezifischen Leitfähigkeit am Extrakt einer wäßrigen Pigmentsuspension") [Determining the specific conductivity of the extract of an aqeuous pigment suspension], and the pH indicated correspondingly is determined in accordance with the test procedure Pigments Marketing, Hoechst AG, 1/9 (2/91) "Bestimmung des pH-Wertes am Extrakt einer wäßrigen Pigmentsuspension" [Determining the pH of an extract of an aqueous pigment suspension], both of which determination methods use double-distilled water instead of the deionized water specified in the test procedure document.

The novel C.I. Pigment Red 57:1 of the present invention named in Example 1 below contains, as auxiliary, abietic acid in the form of its calcium salt (CAS No. 13463-98-4) (about 30 %). The conventional Pigment 57:1 specified in Comparison Example 1 is ®Permanent Rubin L6B02 (Hoechst AG).

EXAMPLES

In the examples below, parts and percentages are by weight.

Example 1

Synthesis 37.4 parts of 4-aminotoluene-3-sulfonic acid were dissolved in 500 parts of water and 26.1 parts of sodium hydroxide solution (33%). After cooling with ice to 0° C., 56 parts of hydrochloric acid (31%) were added and the mixture was then diazotized in 10 minutes at from 0 to 5° C. with 34.5 parts of sodium nitrite solution (40%).

Furthermore, 39 parts of β-hydroxynaphthoic acid were dissolved in 1000 parts of water and 70 parts of sodium hydroxide solution (33%) at 20° C. The diazo suspension was then added to this solution over the course of 30 minutes at 20° C. Following the addition of a solution of 37.8 parts of abietic acid in 380 parts of water and 15 parts of sodium hydroxide solution (33%), the pH was adjusted with dilute hydrochloric acid to 9.0. For laking, a solution of 35 parts of calcium chloride (77–80%) in 100 parts of water was then added dropwise over 5 minutes. Following the adjustment of the pH to 6.0 with dilute hydrochloric acid the pigment suspension was initially heated to 80 to 85° C., stirred at this temperature for 30 minutes and then filtered with suction, and the solid product was washed with water until neutral and free of salt and was dried at 80° C. to constant weight. 126.2 parts of a red color lake were obtained.

1.1 Pigment characteristics

BET surface area: 90 m$^2$/g

Residual moisture content (heating bulb): 1.0% (Karl Fischer: 4.9%, including water of crystallization)

Residual salt content: 0.4 mS/cm pH: 7.4

Thermal stability: DTA (differential thermal analysis), 3° C./min heating rate, closed glass ampule, shows a thermal stability of markedly greater than 250° C.

Particle size and morphology (mass distribution counted by electron microscopy):

The particle size and particle morphology were determined by electron micrographs of the pigment powder. For this purpose the pigment was dispersed in water for 15 minutes and then sprayed on. The micrographs are taken at magnifications of 13,000 and 29,000.

Particle size:

$d_{50}$=120 nm; $d_{25}$=88 nm; $d_{75}$=160 nm.

Particle morphology:

The length-to-width ratio was determined as 2.65:1.

Dielectric characteristics:

$\Omega$·cm: 4·10$^{15}$ $\epsilon$: (1 kHz) 3.7 tan $\delta$: (1 kHz) 4·10$^{-3}$

X-ray diffraction diagram (CuK$_\alpha$ radiation):

2 theta (s=strong, m=moderate, w=weak):

4.72 (s); 11.06 (w); 13.74 (w); 15.07 (m); 15.62 (m); 18.34 (s); 18.70 (s); 19.42 (w); 21.44 (m); 26.05 (s); 27.31 (m).

1.2 Transparency

In a toner resin (polyester based on bisphenol A) an improved transparency was measured (24 $\mu$m coat thickness), the pigmented test toner having been prepared as in Example 1.3.1.

Relative to the standard indicated in the comparison example, a transparency raised by 5 evaluation units and a blue color intensified by 5 evaluation units are found at the same color strength.

Evaluation of the differences in transparency in accordance with the test procedure 1/1: 1≙ a trace, 2≙ slightly; 3≙ noticeably; 4≙ distinctly; 5≙ substantially; 6≙ significantly more transparent.

1.3 Electrostatic properties 1.3.1

5 parts of the pigment from Example 1.1 are incorporated homogeneously into 95 parts of a toner binder (polyester based on bisphenol A) over the course of 45 minutes using a compounder. The mixture is then ground on a universal laboratory mill and is subsequently classified in a centrifugal classifier. The desired particle fraction (4 to 25 μm) is activated with a carrier consisting of silicone-coated ferrite particles with a size from 50 to 200 μm (bulk density 2.75 g/cm$^3$) (FBM 96-100; from Powder Techn.).

Measurement takes place on a customary q/m measuring stand. The use of a sieve with a mesh size of 25 μm ensures that no carrier is entrained when the toner is blown out. The measurements are carried out at a relative atmospheric humidity of from 40 to 60%. As a function of the activation period, the following q/m values [μC/g] are measured:

| Activation period | Charge q/m [μC/g] |
| --- | --- |
| 5 min | −17 |
| 10 min | −17 |
| 30 min | −16 |
| 2 h | −16 |
| 24 h | −15 |

1.3.2

5 parts of the pigment are incorporated homogeneously, as described in Example 1.3.1, into 95 parts of a powder coating binder based on a TGIC polyester, for example ®Uralac P 5010 (DSM, The Netherlands). To determine the deposition ratio, 30 g of the test powder coating are sprayed through a triboelectric gun at a defined pressure. By differential weighing it is possible to determine the amount of powder coating deposited and to define a deposition ratio, in %, and a current flux value (μA) can be derived from the charge transfer.

| Pressure [bar] | Current [μA] | Deposition ratio [%] |
| --- | --- | --- |
| 3 | 1.2 | 78 |

1.3.3

5 parts of the novel magenta pigment and 1 part of the charge control agent described in Example 5 of DE-A-4 031 705, of the formula

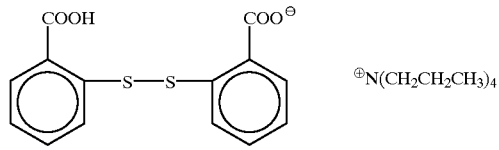

are incorporated, as described in Example 1.3.1, into a toner binder (polyester based on bisphenol A) and measurements are carried out. As a function of the activation period, the following q/m values [μC/g] are measured:

| Activation period | Charge q/m [μC/g] |
| --- | --- |
| 5 min | −1 |
| 10 min | +1 |
| 30 min | +2 |

| Activation period | Charge q/m [μC/g] |
| --- | --- |
| 2 h | +3 |
| 24 h | +2 |

1.3.4

5 parts of the novel magenta pigment and 1 part of the charge control agent mixture described in Preparation Example 1 of DE-A-3 901 153, (highly fluorinated ammonium salt with n=2–5), of the formula

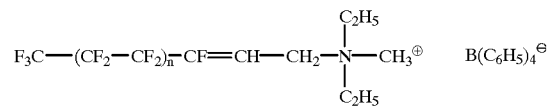

are incorporated, as described in Example 1.3.1, into a toner binder (polyester based on bisphenol A) and measurements are carried out. As a function of the activation period the following q/m values [μC/g] are measured:

| Activation period | Charge q/m [μC/g] |
| --- | --- |
| 5 min | −14 |
| 10 min | −18 |
| 30 min | −20 |
| 2 h | −21 |
| 24 h | −21 |

1.3.5

5 parts of the novel pigment and 1 part of the charge control agent mixture described in Preparation Example 2 of U.S. Pat. No. 5,187,038, (cationic polymer where x=150–800), of the formula

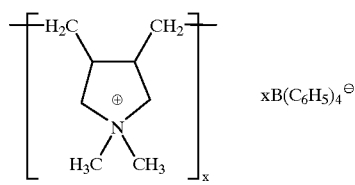

are incorporated, as described in Example 1.3.1, into a toner binder (polyester based on bisphenol A) and measurements are carried out. As a function of the activation period, the following q/m values [μC/g] are measured:

| Activation period | Charge q/m [μC/g] |
| --- | --- |
| 5 min | −9 |
| 10 min | −9 |
| 30 min | −9 |
| 2 h | −9 |
| 24 h | −9 |

Comparison Example 1

The conventional C.I. Pigment Red 57:1 employed in Comparison Example 1 is characterized by the following properties:

1.1 Pigment characteristics

BET surface area: 35 m²/g

Residual moisture content: 0.5% (Karl Fischer: 3.6%, including water of crystallization Residual salt content: 0.1 mS/cm pH: 7.1

Thermal stability: decomposition temperature >250° C. (DTA)

Particle size:

$d_{50}$=160 nm; $d_{25}$=103 nm; $d_{75}$=187 nm.

Particle morphology:

The length-to-width ratio was determined as 2.85:1

Dielectric characteristics

Ω·cm: $3·10^{15}$

ε: (1 kHz) 4.2 tan δ: (1 kHz) $3·10^{-2}$

X-ray diffraction diagram (CuK$_\alpha$ radiation):

2 theta (s=strong, m=moderate, w=weak):

4.85 (s); 11.94 (w); 15.09 (m); 15.66 (m); 18.34 (s); 18.68 (s); 21.44 (m); 26.06 (s); 27.31 (m).

Comparison Example 1.2

The preparation and measurement of the test toner were carried out as described in Example 1.2.

Comparison Example 1.3

Electrostatic Properties

Comparison Example 1.3.1

5 parts of the pigment were incorporated into the toner binder, as described in Example 1.3.1, and measurements were carried out:

| Activation period | Charge q/m [μC/g] |
|---|---|
| 5 min | −7 |
| 10 min | −8 |
| 30 min | −10 |
| 2 h | −13 |
| 24 h | −23 |

We claim:

1. A method of imparting color to an electrophotographic toner, an electrophotographic developer, a resin-containing powder or powdered coating composition, an electret material or an inkjet ink, comprising:

preparing a composition of particles of an azo pigment of the formula (1)

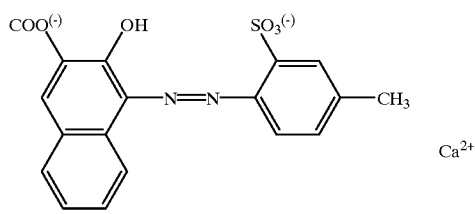

(1)

and 20 to 50% by weight of an auxiliary wherein said azo pigment is synthesized in the presence of 20 to 50% by weight of the auxiliary selected from the group consisting of a rosin, a salt of a rosin, an abietic acid, and a salt of an abietic acid, wherein said weight is based on the overall weight of the azo pigment including said auxiliary, and wherein the particles have a specific surface area of more than 70 m²/g, a length-to-width ratio of on average less than 2.8:1 and a mean particle size $d_{50}$ of less than 130 nm; and adding said particles and optionally a charge control agent to a binder.

2. The method as claimed in claim 1, wherein the particles have a specific surface area greater than 80 m²/g.

3. The method as claimed in claim 1, wherein the particles have a specific surface area greater than 85 m²/g.

4. The method as claimed in claim 1, wherein said auxiliary is selected from the group consisting of a rosin, a salt of a rosin, an abietic acid, and a salt of an abietic acid and is in an amount from 25 to 40% by weight, wherein said weight is based on the overall weight of the azo pigment including said auxiliary.

5. The method as claimed in claim 1, wherein the charge control agent is a triphenylmethane, an ammonium compound, an iminium compound, a fluorinated ammonium compound, a fluorinated iminium compound, a biscationic acid amide, a polymeric ammonium compound, a diallylammonium compound, an aryl sulfide derivative, a phenol derivative, a phosphonium compound, a fluorinated phosphonium compound, a calix(n)arene, a cyclically linked oligosaccharide, a polyester salt, a metal-complex compound, a benzimidazolone, an azine, a thiazine or an oxazine.

6. The method as claimed in claim 1, wherein the charge control agent is in an amount from 0.01 to 20% by weight based on the overall weight of the electrophotographic toner, developer, powder or coating composition.

7. The method as claimed in claim 6, wherein said amount of the charge control agent is from 0.1 to 5% by weight.

8. A pigment composition comprised of particles of an azo pigment of the formula (1)

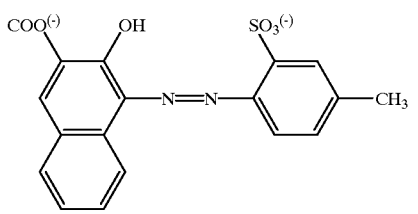

(1)

and 20 to 50% by weight of an auxiliary selected from the group consisting of a rosin, a salt of a rosin, an abietic acid, and a salt of an abietic acid, wherein said weight is based on the overall weight of the azo pigment including said auxiliary, wherein said azo pigment is synthesized in the presence of 20 to 50% by weight of the auxiliary selected from the group consisting of a rosin, a salt of a rosin, an abietic acid, and a salt of an abietic acid, wherein said weight is based on the overall weight of the azo pigment including said auxiliary, and wherein the particles have a specific surface area of more than 70 m$^2$/g, a length-to-width ratio of on average less than 2.8:1 and a mean particle size $d_{50}$ of less than 130 nm.

9. The pigment composition as claimed in claim 8, wherein said azo pigment is prepared in the presence of 25 to 40% by weight of the auxiliary.

10. An inkjet ink comprising from 0.01 to 50% by weight of a pigment composition as claimed in claim 8.

11. An inkjet ink as claimed in claim 10, comprising from 0.5 to 20% by weight of said pigment composition.

12. An inkjet ink as claimed in claim 10, wherein the ink is a hot melt ink.

* * * * *